United States Patent [19]
Mermelstein

[11] 3,935,636
[45] Feb. 3, 1976

[54] METHOD OF MAKING A PRESSURE TRANSDUCER

[75] Inventor: Seymour Mermelstein, Newton, Mass.

[73] Assignee: Tyco Laboratories, Inc., Waltham, Mass.

[22] Filed: Mar. 25, 1975

[21] Appl. No.: 561,683

Related U.S. Application Data

[62] Division of Ser. No. 456,122, March 29, 1974, Pat. No. 3,899,766.

[52] U.S. Cl. ............... 29/619; 29/592; 29/610 R; 156/74; 156/221
[51] Int. Cl.² .......................................... H01C 17/28
[58] Field of Search ............ 29/610 R, 610 SG, 613, 29/619, 592; 73/398 AR; 338/42, 36, 2, 4; 156/74, 221

[56] References Cited
UNITED STATES PATENTS

| | | | |
|---|---|---|---|
| 2,632,725 | 3/1953 | Marks et al. | 156/74 |
| 3,389,362 | 6/1968 | McLellan | 338/42 X |
| 3,711,941 | 1/1973 | Sessler et al. | 29/592 |
| 3,793,495 | 2/1974 | Heap | 338/42 X |
| 3,848,329 | 11/1974 | Igarashi et al. | 29/610 X |

FOREIGN PATENTS OR APPLICATIONS

| | | | |
|---|---|---|---|
| 627,474 | 5/1963 | Belgium | 29/592 |

*Primary Examiner*—Victor A. DiPalma
*Attorney, Agent, or Firm*—Schiller & Pandiscio

[57] ABSTRACT

A low cost pressure transducer can be manufactured and assembled with automatic or semiautomatic production line techniques. The transducer includes a pressure fitting, a diaphragm, a strain gage comprising a bridge circuit and tabs with leads for the bridge circuit, and a termination board, all contained within a case. One end of the case is swaged over a flange on the fitting in order to sealingly clamp the diaphragm between a shoulder in the case and the fitting flange. The bridge portion of the strain gage is adhesively secured to the diaphragm. A pressure distribution member is placed over the bridge so pressure may be applied to the assembly during heat-curing of the adhesive which secures the gage to the diaphragm. The termination board has four terminals and a corresponding number of conductive strips. It is positioned in the case so that each of the conductive strips is pressed into electrical contact with a corresponding lead on the tabs of the gage. The other end of the case is swaged over the termination board to lock the latter in place.

4 Claims, 5 Drawing Figures

METHOD OF MAKING A PRESSURE TRANSDUCER

This application is a division of my copending U.S. Application Ser. No. 456,122, filed Mar. 29, 1974 for Pressure Transducer now U.S. Pat. No. 3,899,766.

This invention relates to pressure transducers and more particularly to novel diaphragm transducers of the resistive strain gage type and the manufacture thereof.

Pressure transducers of the type used to sense and measure fluid pressure, generally utilized a mechanical sensing element. These elements are relatively thin-walled elastic members, such as diaphragms, plates, shells or tubes which offer the pressure (force) a surface (area) to act upon. When the pressure to be measured is not balanced by an equal pressure acting on the opposite surface, the elastic member is caused to deflect, producing stress and resulting strain in the element. This resulting strain can be measured by a resistive strain transducer, more commonly known as the strain gage. It generally consists of a sensing element in the form of a conductor or semiconductor of small cross-sectional area which is mounted to one surface of the elastic member (which is more commonly in the form of a diaphragm) so that it expands or contracts with the elastic member. This deformation of the sensing element causes it to undergo a change in resistance and thus exhibits what has been termed a piezoresistive effect. Hence, a strain gage senses strain by its own deformation and transduces the deformation into a resistance change.

The resistance change of a strain gage is usually converted into voltage by connecting one, two or four similar sensing elements as arms of a Wheatstone bridge, also called a strain gage bridge. By applying a voltage to the bridge the bridge output voltage will be a measure of the strain sensed by each sensing element. Each arm of such a bridge containing a strain-sensing element is referred to as an active arm. Strain transduction can, therefore, be said to be performed by the active arms of a strain-gage bridge.

Various types of strain gage transducers have been commercially developed including bare-wire bondable strain gages, bondable wire strain gages on a paper or plastic carrier base, metal-foil bondable strain gages, semiconductor strain gages and deposited-metal (thin film) strain gages.

In pressure transducers of the type employing strain gages mounted on diaphragms, typically the diaphragm material will have a thickness in the order of 0.005 inch with an effective diameter of 0.5 inch for a 0–15 psi transducer. Heretofore, a great deal of skill as well as careful procedure has been required to mount the diaphragm in a casing and to complete the assembly of the transducer so that the diaphragm and strain gage will exhibit uniform characteristics. As a result, most accurate commercially available pressure transducers of the resistive strain gage type have been difficult to assemble and, thus, relatively expensive to manufacture. One solution which has been suggested to simplify the assembly procedure is to make the diaphragm and casing as a single part. Such an approach, however, has not proven feasible since it makes it difficult to produce a diaphragm having the desired physical characteristics.

Another problem encountered with the commercially available pressure transducers of the type utilizing metal-foil strain gages is that external leads must be soldered or welded to the terminals of the strain gage.

Accordingly, an object of the present invention is generally to overcome the above disadvantages of the prior art.

Another and more specific object of the present invention is to provide an improved pressure transducer which is easily and quickly assembled and thus is relatively inexpensive to manufacture.

Yet another object of the present invention is to provide an improved inexpensive pressure transducer whose parts can be made by automated equipment, and more importantly, whose assembly can be automated or at least semi-automated.

Still another object of the present invention is to provide an inexpensive method for making pressure transducers of the resistive strain gage type.

A further object is to provide pressure transducers utilizing strain gages of the resistive type wherein terminal conductors are in pressure contact with the terminal tabs of the strain gage, thereby eliminating the need for welding or soldering together the terminal conductors and gage tabs.

Described briefly, a transducer which is constructed in accordance with the present invention comprises a diaphragm which is assembled between a pressure fitting and a portion of a housing or case. The end of the case is swaged over the end of the fitting in order to clamp and seal the diaphragm in place. A metal foil gage comprising an encapsulated strain gage bridge as a center portion and tab portions which include unencapsulated electrically conductive lead strips or terminal tabs is then added to the foregoing subassembly, with the center portion of the gage being installed on an adhesive-coated side of the diaphragm. In the preferred method of assembling the transducer device, the center portion of the gage is adhesively staked to the diaphragm and a pressure distribution member is placed over the center portion of the gage. Then a vented termination board having a plurality of terminals and a corresponding number of conductive strips is secured to the case in spaced relation to the diaphragm so that each of the conductive strips on the board is clamped into electrical contact with a corresponding one of the terminal tabs. The diaphragm is then subjected to a balanced pressure and the assembly heated for a predetermined period of time in order to cure the adhesive so as to secure the gage to the diaphragm and case. In an alternative method of making the transducer, the step of curing the adhesive to bond the gage to the transducer precedes installation of the termination board.

Other features and advantages of the invention are described or rendered obvious in the following detailed description which is to be considered together with the accompanying drawings wherein.

In the drawings, like numerals refer to like parts.

Figure 1:
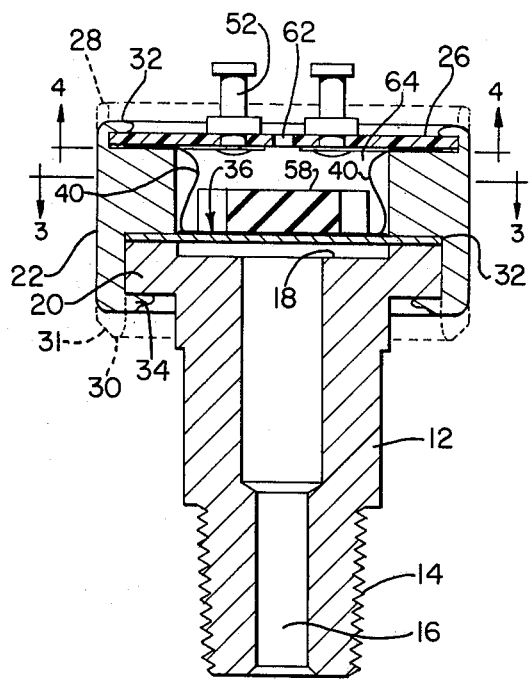
FIG. 1 is a longitudinal section of one embodiment made in accordance with the invention.

The illustrated pressure transducer is of the type which measures gage pressures, i.e., pressures which are measured with ambient pressure as a reference. The transducer includes a cylindrically shaped pressure fitting 12 which is threaded at one end as shown at 14 and is provided with a center bore 16 for introducing the fluid whose pressure is to be measured. The opposite end of the fitting is counterbored at 18 and is provided with a circular peripheral flange 20 for connection to a cylindrical housing or case 22.

The transducer also includes a diaphragm 32 which is of a flat circular configuration. The diameter of diaphragm 13 is essentially the same as the diameter of flange 20 of fitting 12. The diaphragm can be made from a variety of materials, such as metal, quartz, reinforced plastics, graphite and sapphire. Types 17-7PH stainless steels are preferred since they have very high tensile strength and are highly resistant to corrosion. Typically, the stainless steel diaphragms will have an effective diameter of 0.5 inches and a thickness in the order of 0.005 inch for a 0–15 psi transducer.

The case 22 has an internal radially directed flange 24 and its wall has a constant internal diameter above and below flange 24. The upper and lower ends of case 22 in its as-formed state, i.e., before assembly of the transducer, are illustrated in dotted lines at 28 and 30 respectively. The internal diameter of the case below flange 24 is sized so that it will snugly accommodate diaphragm 32 and flange 20 of fitting 12. The internal diameter of the wall of case 22 above flange 24 is sized so that it will snugly accommodate a termination board 26 (the latter is described in greater detail hereinafter). Flange 24 of the case acts as a shoulder or stop for both fitting 12 and termination board 26. Preferably, but not necessarily, case 22 is formed so that its lower end 30 has an outside bevel as shown at 31. In the completed transducer, the upper and lower ends 28 and 30 of the wall of case 22 are swaged over termination board 26 and flange 20 of fitting 12 as shown at 32 and 34 in order to secure the board, diaphragm and fitting to the case.

Mounted to diaphragm 32 on the side facing termination board 26 is a strain gage identified generally by numeral 36. The gage comprises flexible end or tab portions 42 which are not attached to the diaphragm but instead extend up and are sandwiched between flange 24 and terminal board 26. Gage 36 is an electrical bridge and tab portions 42 cooperate with conductors carried by termination board 26 to couple the bridge circuit to terminal pins 52 which form part of the terminal board.

As described in greater detail below, a flexible block 58 made preferably of a silicone rubber is disposed over the gage. Block 58 serves no particular function in the finished transducer but is used as a pressure distribution element during assembly of the transducer. Block 58 covers a substantial portion of the strain gage and is provided with two concave sides 59 so as to leave spaces for the tabs 42 to extend up between flange 24 and termination board 26.

Strain gage 36 may comprise one or more strain-sensitive resistance elements which can be formed in a variety of different configurations depending upon how the transducer is to be used. Thus for example, the strain gage may comprise a single resistance element or a pair of resistance elements which are to be connected into an exterior measuring circuit, e.g., they may be connected as legs of an exterior bridge circuit or to an ohmmeter. Preferably, however, gage 36 comprises a resistance bridge consisting of a plurality of interconnected resistance elements. Preferably gage 36 is preformed as a closed bridge circuit having terminal leads for connection to terminal pins 52 of terminal board 26. As an alternative, gage 36 may comprise an open bridge circuit, but a closed circuit is preferred since use of an open circuit entails an additional soldering or welding step to connect the gage resistance elements to its terminal leads. Furthermore an electrical pressure connection to a closed bridge circuit is not critical in terms of contact resistance variation an an open circuit would be.

Figure 5:
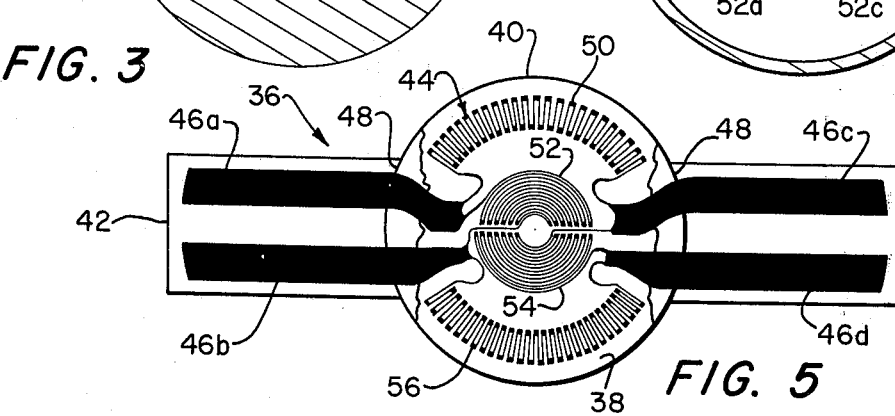
FIG. 5 is a plan view of the strain gage employed in the embodiments described.

Referring now to FIG. 5, gage 36 comprises a flexible base or carrier 38 having a generally circular center portion 40 and oppositely extending tab portions 42. A resistance bridge circuit 44 overlies and is attached to the center portion 40 of base 38, and connected to the bridge circuit as hereinafter described so as to render it a closed bridge are four leads in the form of conductive strips 46($a$–$d$). The latter are arranged in pairs and overlie and are attached to the tab portions 42. The resistance bridge circuit and adjacent portions of conductive strips 46 are encapsulated by an overlying electrically insulating layer 48 (portions of the latter have been broken away in FIG. 5 for convenience of description and illustration). Most of the area of strips 46 are exposed for electrical contact with terminal board 26. Conductive strips 46 and the elements of bridge circuit 44 consist of a thin layer of a selected electrically conductive material, e.g. about 0.0002 inch thick, and may be formed in accordance with well known printed circuit techniques. Thus for example, a thin layer of metal may be deposited on the carrier and then selected portions of the layer of metal may be etched away so as to leave a metal pattern substantially as shown in FIG. 5. Other manufacturing techniques known to persons skilled in the art also may be used to form circuit 42 and bands 44 (see H. N. Norton, *Handbook of Transducers for Electronic Measuring Systems*, pp. 557–564, Prentice-Hall, 1969).

Bridge circuit 44 consists of four resistors 50, 52, 54 and 56. Resistors 50 and 52 each have an end connected to lead 46$a$, and their opposite ends are connected to leads 46$c$ and 46$b$ respectively. Resistors 54 and 56 each have an end connected to lead 46$d$ and their opposite ends are connected to leads 46$c$ and 46$b$ respectively.

The base 38 of strain gage 36 may be made of a variety of materials well known to persons skilled in the art. Polyimides are preferred as base materials because of the flexibility of the leads, although nitrocellulose paper is satisfactory where the gage is used at temperatures between −100°F and +150°F. Other plastic materials also may be used. The bridge and its leads can be made of various types of electrically conductive materials and preferably is made of a copper nickel alloy, such as the alloy sold under the tradename Constantan. Nickel-chromium and platinum-irridium alloys, however, have also been found acceptable for high-temperature applications while iron-chromium-aluminum and iron-nickel-chromium alloys are good when higher gage factors are required and operating temperatures are moderate.

A number of different materials may be used to form the insulating layer 48 used to encapsulate the bridge circuit. Thus, layer 48 may also comprise a polyimide.

The termination board 26 comprises a circular flat electrically insulating disc 60 to which four electrically conductive terminal pins or posts 52($a$–$d$) are anchored. Affixed to the surface of board 26 which faces the diaphragm 32 are four electrically conductive strips 54(a–d). Posts 52 extend through disc 60 and each is electrically connected to a corresponding one of the posts 54. Strips 54a and 54b are parallel to each other and are spaced so that they will contact the terminal leads 46a and 46b respectively, when the terminal board is mounted in the case 22. Similarly, strips 54c and 54d are parallel to one another and are spaced so that they will contact the terminal leads 46c and 46d respectively when board 26 is mounted on case 22.

Figure 2:
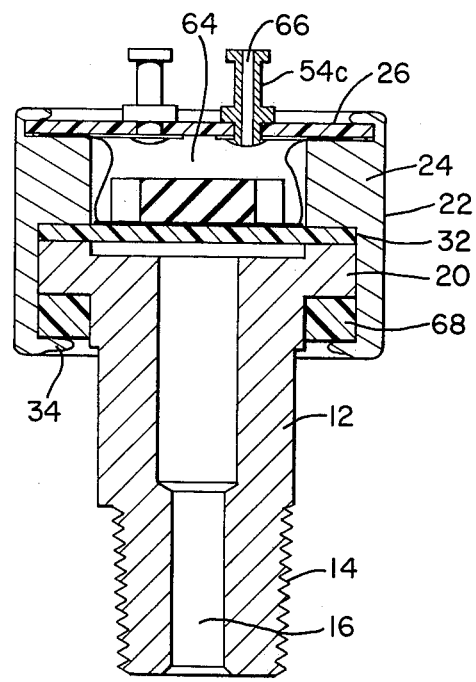
FIG. 2 is a longitudinal section of a modification of the embodiment of FIG. 1.
Figure 3:
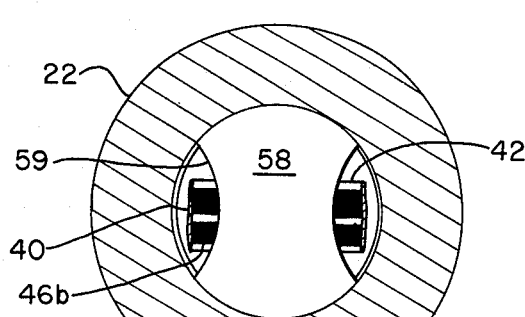
FIG. 3 is a cross-sectional view taken along line 3—3 of FIG. 1.
Figure 4:
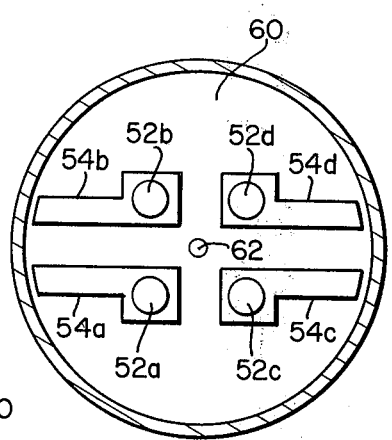
FIG. 4 is a cross-sectional view taken along line 4—4 of FIG. 1.

Disc 60 is provided with one or more vent holes 62 in order that the pressure in the chamber 64 formed by board 26, case 22 and diaphragm 32 is always equal to the ambient pressure. As an alternative measure as shown in FIG. 2, board 26 can be modified by eliminating vent holes 62 and making one or more of the terminal posts 52 hollow (see terminal post 54c in FIG. 2 which has a through bore 66 leading to chamber 64).

The pressure fitting 12 and case 22 of the transducer 10 can be individually manufactured in accordance with methods well known in the art. For example, they can be produced on a screw machine, they may be cold formed, forged or cast, or they can be drawn as "one hit" parts in which all features of the parts are formed in one stroke of a press machine. The case 22 should be made of a malleable material having good severe forming characteristics so that it can be swaged as described below, while the pressure fitting 12 can be made of stiffer materials. By way of example, case 22 may be made of Type 303 stainless steel while fitting 22 can be made of metals and alloys, e.g. a stainless steel, or plastics such as a glass reinforced epoxy.

The diaphragm 32 can be made from a number of materials such as stainless steel, beryllium, copper, glass fiber reinforced plastic, quartz, sapphire, carbon and the like, depending upon the application of the device. Preferably it is punched from a sheet of non-brittle material such as a selected stainless steel. However, if the diaphragm is made of a brittle material such as quartz or sapphire, the transducer design is modified as shown in FIG. 2 in order to accommodate a thermoplastic ring 68 which is seated against the lower surface of the peripheral flange 20 and is clamped against the latter by the swaged over end portion 34 of case 22. Ring 68 acts as a secondary seal (in addition to the sealant hereinafter described which is provided along the mating surfaces of the flange 20, diaphragm 32 and the flange 24). The primary function of ring 68 is to distribute or equalize the clamping pressure on the diaphragm so as to apply an even load along the periphery of the diaphragm when the case is swaged in position. Ring 68 permits an immense load to be put on the edge of the diaphragm, typically in the order of several thousand psi, without uneven stress. Thus, ring 68 provides a good seal and prevents fracturing of the diaphragm during manufacture. It is to be noted also that placing an uneven stress on the diaphragm can cause it to fail prematurely due to fatigue as well as affecting the accuracy of the measurements made with the transducer. It is to be noted also that diaphragm deformation can be avoided or minimized by controlling the swaging pressure. During the swaging operation, distortion of the case (which affects the effective diaphragm size) can be controlled and prevented by a close-fitting pin and sleeve swaging assembly (not shown) that completely surrounds and supports the case.

In accordance with the method of this invention, the above described transducers can be assembled at less cost and in less time than transducers heretofore available. The method requires less skill than is required with conventional methods of making strain gage pressure transducers and can be carried out by automatic or semi-automatic assembly equipment. Furthermore, because the transducer comprises a plurality of interfitting parts, it is possible to employ diaphragms having predetermined characteristics such as tensile strength and flexibility.

The preferred method of assembling the transducer of FIG. 1 will now be described. First of all, a liquid sealant, preferably of the anaerobic variety, is coated on the mating surfaces of diaphragm 32, flange 24 of case 22, and flange 20 of fitting 12. By way of example, the sealant may be Loctite Plastic Gasket. Then the diaphragm and fitting are inserted in the case so that the edge of the diaphragm is sandwiched between flanges 24 and 20 and the end 30 of case 22 is swaged over flange 20 as shown at 34 in order to clamp the diaphragm in place and trap the sealant. Preferably the clamping pressure exerted on the diaphragm is in the order of 2000–4000 psi, which is high enough for the case, diaphragm and fitting to constitute a rigid subassembly. The latter is cleaned to remove any excess sealant.

Then the subassembly is oriented with the fitting extending down from the case and is axially rotated at high speed with the plane of the diaphragm kept horizontal. A metered drop of a solvent thinned epoxy-phenolic adhesive is then dropped on the center of the top surface of the diaphragm. Centrifigul force causes the adhesive to spread almost instantaneously into a thin, uniform and tack-free film. At the same time, the upper surface of flange 24 is coated with the same adhesive. Then the strain gage 36 is inserted into the case 22 via its top end and brought down against the diaphragm. Since the diameter of the encapsulated center portion 40 of gage 36 is only slightly smaller than the diameter of flange 24, the former will selflocate when placed into contact with the diaphragm over the epoxy-phenolic adhesive. Then some more of the same adhesive is applied to the edge of the center portion of the gage base 38, block 58 is placed over the center portion of the gage as shown, and block 58 and the gage are staked to the diaphragm by subjecting them to spot heating at about 300°F and under about 40 psi pressure. The heat staking is accomplished by engaging block 58 with a heated rod. A balancing pressure of about 40 psi pressure is applied to the underside of the diaphragm during this staking operation to prevent diaphragm distortion. This staking operation is performed to hold the gage in place and thus only a portion of the gage is required to be bonded to the diaphragm by the staking operation.

In the preferred method of manufacture, the tab portions 42 of the gage are next spot heat staked to the adhesive coated upper surface of flange 24 by heating at about 300°F under light pressure.

As an optional measure, a coating or ring of electrically insulating material (not shown) can be located between the tab portions 42 and flange 24, and/or between the ends of tab portions 42 and termination board 26 to further assure against the leads being shorted out by the case. However, it is to be noted that adhesive coating on flange 24 and the plastic substrate of the gage are non-conducting.

The termination board 26 is then inserted in case 22 so that its contact strips 54a–d are aligned with and contact the gage leads 46a–d respectively. Preferably the board is sufficiently translucent (or transparent) to permit visual alignment of the strips 54 and leads 46. The board 26 may also be kept in place by a friction fit with case 22 or by adhesively staking it to the case under heat and pressure. With board 26 properly aligned with the tab portions of the gage, the end 28 of the case is swaged over the edge of the board so as to form a lip as shown at 32 which holds the board and the tab portions of the gage tightly against flange 24 and thereby maintains the strips 54 in permanent electrical contact with the corresponding gage leads 46.

The resulting assembly may now be electrically tested for shorts. The entire assembly is then placed in an oven at about 300°F for approximately two hours in order to cure the adhesive which bonds the gage to the diaphragm and case. During this curing step, both sides of the diaphragm are maintained at equal pressures, preferably at about 40 psi, and block 58 acts as a pressure distribution member to hold the gage flat against the diaphragm while the adhesive is being cured. Although block 58 is left in place, it serves no function in the finished device.

Although the above method is preferred, it can be modified without departing from the invention. For example, curing of the adhesive between the gage and the diaphragm can be performed as a separate step prior to installation of the termination board, in which event block 58 may be removed from the case before board 26 is secured in place.

In this connection it is to be noted that it is difficult to permanently bond silicone rubber to other materials and that in the preferred form of the method described above, the epoxy-phenolic adhesive provides a bond of low peel strength between block 58 and the gage. However, that is adequate since the only purpose of staking the block to the gage is to render it effective under applied air pressure to press the gage flat against the diaphragm while the intervening adhesive is being cured. Thus, the block may become separated from the gage and be loose within the finished device without affecting its operation or accuracy, provided however, that the block must not block off the vent holes. The latter problem is avoided in the embodiment of FIG. 1 by virtue of the fact that the terminal posts 52 project into the case far enough to prevent block 52 from closing off vent hole 62. If hollow terminal posts are used as in FIG. 2, the problem of vent hole blockage is avoided by providing stand-offs or projections (not shown) on the upper side of block 58 that can maintain it spaced from the termination board far enough to keep passageways 66 unblocked.

It is contemplated also that block 58 may be made of other flexible materials such as neoprene or Buna-N rubber, other adhesives may be used in the assembly procedure, and the gage need not be encapsulated (encapsulation is preferred since it renders the gage insensitive to moisture). If an unencapsulated gage is used, it is preferred to make block 58 of neoprene and to permanently bond it to the gage by an intervening cement, whereby the block and cement effectively protect the gage against moisture. As a further option, block 58 need not be adhesively bonded to the gage, but be held in place by a friction fit with portions of flange 24.

After assembly as above described, the complete transducer is tested to check on the pressure seal of the diaphragm, to insure that all electrical connections are satisfactory and to determine overall performance of the gage.

In operation, the pressure fitting 12 is attached to a conduit or vessel containing the fluid whose pressure is to be measured. one pair of terminal posts 54 which are connected to opposite ends of the bridge circuit, e.g. posts 54a and 54d, are coupled to a voltage source (not shown) for exciting the gage bridge. The remaining pair of terminal posts are connected to a measuring device, e.g., a meter (not shown), which measures the output voltage of the bridge. When the pressure of the fluid being measured is equal to the ambient pressure in chamber 64, the diaphragm will be undeflected, with the result that the gage bridge will be balanced and the voltage output to the meter will be zero plus some offset. If, however, the pressure applied via fitting 12 is not equal to the ambient pressure, the diaphragm will deflect, producing stress and resulting strain in the diaphragm. Since the resistance arms of the gage bridge exhibit a piezoresistive effect, the resistance of the gage bridge arms will change in proportion to the amount of strain, causing the bridge to become unbalanced and hence produce a voltage output to the measuring device plus the offset which is in proportion to the amount of strain on the diaphragm 12 and thus proportional to the pressure differential.

Since certain obvious changes may be made in the method and apparatus herein described without departing from the scope of the invention, it is intended that all matter contained herein shall be interpreted as illustrative and not in a limiting sense.

What is claimed is:

1. The method of making a pressure transducer comprising the steps of:

providing a hollow case which is open at its ends and has an internal flange disposed intermediate said ends, inserting a diaphragm into one end of said case so that said diaphragm engages said flange, mechanically deforming the wall of said case at said one end so that a portion of said wall is bent over the edge of said diaphragm and clamps said edge to said flange, providing a strain gage comprising a main portion which includes a resistance bridge and oppositely disposed tab portions which include leads for said bridge disposed in a predetermined geometric pattern, inserting said strain gage into the other end of said case so that said main portion engages said diaphragm, and providing an adhesive between said main portion and said diaphragm, adhesively securing at least a part of said main portion to said diaphragm, providing a termination board having a plurality of conductive segments disposed in a geometric pattern similar to that of said gage leads, positioning said termination board in the other end of said case so that said gage tab portions are sandwiched between said board and said flange and so that each of said segments is aligned and in electrical contact with the corresponding one of the leads of said strain gage, and mechanically deforming the wall of said case at said other end so that a portion of said wall is bent over the edge of said board and clamps said board to said flange.

2. The method of claim 1 including the step of subjecting both sides of said diaphragm to equal pressures while said main portion of the gage is being adhesively secured to said diaphragm.

3. The method of claim 1 including the step of heating the assembled parts to cure the adhesive bonding the main portion of the gage to the diaphragm after said termination board has been clamped to said flange.

4. The method of claim 1 wherein adhesive is provided between said gage and diaphragm by dropping a limited amount of a fluid adhesive on said diaphragm at substantially the center thereof after said diaphragm has been clamped to said flange, and rapidly rotating said case so that centrifugal force will cause said adhesive to spread out and form a thin film covering said diaphragm.

* * * * *